United States Patent [19]

Courtois et al.

[11] Patent Number: 5,146,454
[45] Date of Patent: Sep. 8, 1992

[54] SYSTEM AND METHOD FOR CONTROLLING THE ACCESS RATES OF PACKET SWITCHING NETWORK STATIONS

[75] Inventors: Pierre-Jacques F. C. Courtois; Guy F. J. Scheys; Pierre N. W. Semal, all of Brussels, Belgium

[73] Assignee: U.S. Philips Corporation, New York, N.Y.

[21] Appl. No.: 621,108

[22] Filed: Nov. 30, 1990

[30] Foreign Application Priority Data

Dec. 14, 1989 [EP] European Pat. Off. ........ 89203188.1

[51] Int. Cl.$^5$ ............................................ H04Q 11/04
[52] U.S. Cl. ..................................... 370/60; 370/94.1
[58] Field of Search ................. 370/60, 94.1, 84, 58.2, 370/105.1

[56] References Cited

U.S. PATENT DOCUMENTS

| | | | |
|---|---|---|---|
| 4,534,024 | 8/1985 | Maxemchuk | 370/60 |
| 4,611,322 | 9/1986 | Larson | 370/60 |
| 4,696,001 | 9/1987 | Gagliardi et al. | 370/60 |
| 4,734,908 | 3/1988 | Hedlund | 370/60 |
| 4,862,451 | 8/1989 | Closs | 370/60 |

Primary Examiner—Douglas W. Olms
Assistant Examiner—T. Samuel
Attorney, Agent, or Firm—David R. Treacy

[57] ABSTRACT

A data packet switching network is formed by a number of transmitting/receiving stations which are interconnected by radio communication channels through which data packets can be transferred from one station to another according to a routing scheme. Each station is capable of altering its own access rate and of calculating and transmitting first, second and third parameters. The first parameter is indicative of the respective station's output flow (the number of packets successfully transferred per time unit). The second parameter is indicative of the respective station's input flow increase tendency (a measure based on the output flows of the neighboring stations which the station can relay). The third parameter is indicative of the load of the respective station. In each station, the first parameter is calculated and transmitted at regular time intervals to all neighboring stations in reach of the respective station. Thereafter, the second and third parameters are calculated in each station and transmitted to its neighboring stations. After reception of the second and third parameters, each station determines which neighboring station has the largest flow increase tendency and alters its own access rate to bring the load of this neighboring station closer to a nominal channel load.

17 Claims, 3 Drawing Sheets

I———J———K———L $$\text{if } G_r(T_K) > 1+\varepsilon, \quad \text{then } g(K) \leftarrow \max\{g(K)-\delta_1 \cdot g_{min}\},$$

$$\text{if } \begin{cases} 1-\varepsilon \leq G_r(T_K) \leq 1+\varepsilon, \\ IFIT(K) \neq [O(K)]^{-1}, \end{cases} \quad \text{then } g(K) \leftarrow \max\{g(K)-\delta_2 \cdot g_{min}\},$$

$$\text{if } \begin{cases} 1-\varepsilon \leq G_r(T_K) \leq 1+\varepsilon, \\ IFIT(K) = [O(K)]^{-1}, \end{cases} \quad \text{then } g(K) \leftarrow \min\{g(K)+\delta_3 \cdot g_{max}\},$$

$$\text{if } \begin{cases} G_r(T_K) < 1-\varepsilon, \\ T_K \in R(K), \\ IFIT(T_k) = [O(K)]^{-1}, \end{cases} \quad \text{then } g(K) \leftarrow \min\{g(K)+\delta_4 \cdot g_{max}\},$$

FIG.3A

| $\varepsilon$ | $\delta_1$ | $\delta_2$ | $\delta_3$ | $\delta_4$ |
|---|---|---|---|---|
| 0.25 | $\frac{g(K)}{2}(1-\frac{1}{G_r(T_K)})$ | $g(K)/4$ | $g(K)/2$ | $g(K)(\frac{1}{G_r(T_K)}-1)$ |

FIG.3B

SYSTEM AND METHOD FOR CONTROLLING THE ACCESS RATES OF PACKET SWITCHING NETWORK STATIONS

BACKGROUND OF THE INVENTION

1. Field of the Invention

The invention relates to a system and method for controlling the access rate of stations in a data packet switching network, comprising a number of transmitting/receiving stations interconnected by radio communication channels through which data packets can be transferred from one station to another according to a routing scheme.

2. Description of the Related Art

Channel access control protocols aim at maximizing the throughput of the radio channel by optimally tuning some control variables. In pure and slotted ALOHA networks, the control variables determine the rate at which each station transmits, while in CSMA networks, they determined the rate at which each station senses the channel. In the remainder of this application, the access rate of a station shall be understood to mean the rate at which a station transmits (in an ALOHA network) or senses the channel (in a CSMA network). In a single hop topology, there is conceptually one single channel and relatively well understood relations exist between the throughput of the channel and the control variables. These relations provide clear objectives to tune the control variables. In multihop topologies, there may be conceptually as many independent channels as there are stations, and no accurate relation exists for the global throughput.

SUMMARY OF THE INVENTION

The object of the invention is now to provide a method for controlling the access rate of the stations in a packet switching network such that the output ratio of the station (the ratio between a flow of packets successfully transmitted to and acknowledged by another station, and a flow of packets which have to be sent by said station); with minimum output ratio is increased by optimally tuning the load of the stations which are in direct reach of said station with minimum output ratio, and by optimally sharing the load of said stations among the station contributing to said load.

In agreement with this object the invention provides a system for controlling the access rate of stations in a data packet switching network, comprising a number of transmitting/receiving stations interconnected by radio communication channels through which data packets can be transferred from one station to another according to a routing scheme, each station comprising:

communicating means for receiving data packets from, and transmitting data packets to, respective other stations of said network which are in transmission range of said station, said communicating means communicating with said channels at an access rate, first calculating means for calculating a first parameter which is mathematically related to output flow of said station, output flow being the number of packets successfully transmitted per unit of time, second calculating means for calculating a second parameter which is mathematically related to input flow of said station, input flow being a measure of output flows of said other stations, said second parameter increasing as said output flows decrease, third calculating means for calculating a third parameter indicative of a total load of said station, means for transmitting said first, second and third parameters to said other stations, and for receiving from said other stations (a) first other station parameter information which is mathematically related to output flow of the respective other station, said output flow being the number of packets successfully transmitted by the respective other station per unit of time, (b) second other station parameter information which is mathematically related to input flow of said respective other station, said (c) third other station parameter information indicative of total load of said respective other station, altering means for altering said access rate of said station, means for controlling said transmitting means to transmit said first parameter at regular intervals, comparison means for comparing second parameter information and said third parameter information received from at least two said other stations to determine which said other station is a heaviest loaded station having the largest input flow increase tendency, and said access rate with respect to said heaviest loaded station responsive to said third parameter information, in such manner as to bring said total load of said heaviest loaded station closer to a nominal channel load.

In a preferred method according to the invention the first parameter is an output ratio, said output ratio being a ratio between a flow of packets successfully transmitted to and acknowledged by another station, and a flow of packets which have to be sent by said station. The output ratio is preferably calculated by said first calculation means as the ratio between the number of packets successfully sent and acknowledged during a predetermined time period and the sum of said number and the number of packets which are still in the queue at the end of said period.

Preferably the second parameter is the input flow increase tendency, a definition of which will be given in the figure description.

BRIEF DESCRIPTION OF THE DRAWING

The invention will now be explained in more detail with reference to the accompaning drawings.

FIG. 3A provides an overview of the general access rate update rules used in the method according to the invention.

FIG. 3B provides a possible set of values for the protocol parameters.

DETAILED DESCRIPTION OF THE PREFERRED EMBODIMENTS

Before dealing with channel access control protocols for multihop networks, first the function of such protcols in single hop networks will be recalled.

In single hop networks, the channel load G is determined by the sum of the access rates $g(K)$ of the various stations. G needs to be controlled in order to maximize the throughput of the channel. A too large channel load leads to too many collisions while a channel load which is too small leads to too long idle periods. Thus, an optimal channel load $G_{nom}$ exists. This optimal channel load must be maintained by tuning the access rates g(K) of the stations or by tuning some variables which directly control these access rates g(K). This is the objective of the access control protocol.

A first category of such protocol could work as follows. Each station K collects information on the status of the channel by listening to it, and tunes its own access rate g(K) accordingly. For example, to the optimal channel load corresponds an optimal percentage of collided packets. By measuring the current percentage of collided packets and by comparing it to the optimal percentage, each station can modify its own access rate in order to adjust it to the optimal value. In CSMA networks, the same strategy can operate on the basis of an optimal average length for the idle periods. This type of strategy merely implies that each station listen to the channel.

Another category of protocols is based on exchanges of information between stations (thus, such protocols need reserved channel capacity for these exchanges). For example, each station could transmit its status (inactive or waiting to transmit) so that the number m of stations with packets to transmit would be known. In this case, each station could tune its individual access rate to $G_{nom}/m$. The stations could also inform how much they are in need to transmit (by making a bid); the total channel capacity could then be shared according to these needs. Compared to the first category, such exchanges of information not only improve the tuning of the channel load, but also allow the channel capacity to be shared on demand. This advantage may, however, be rather meager and not justify the channel capacity used for its implementation. Nevertheless, there are situations (multiple hop topologies) where such information exchanges can be extremely useful.

Figures 1, 2:
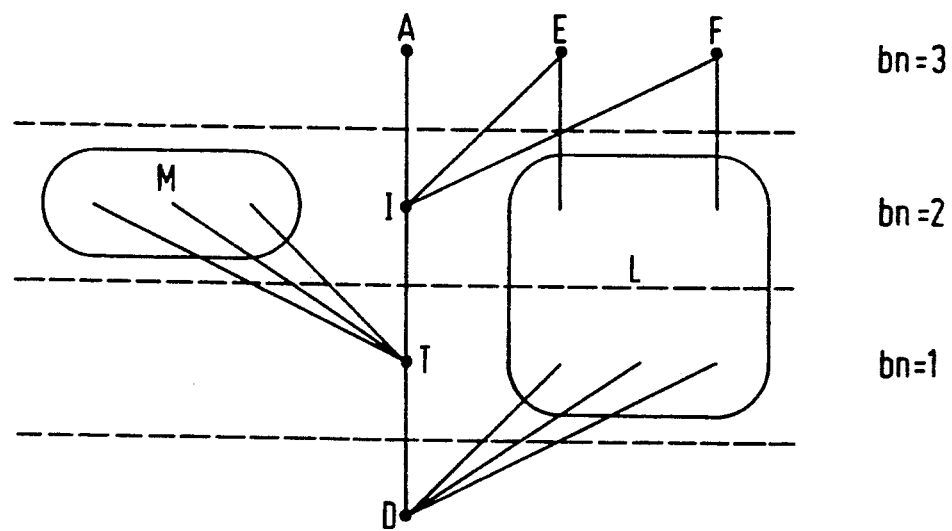
FIG. 1 illustrates a rather simple multiple hop packet radio network.
FIG. 2 illustrates very schematically a multihop radio network.

In multihop topologies not all the stations are in receiving range of each other, so the situation is as if there were several different channels. Consider the situation of FIG. 1 illustrating a number of stations I, J, K and L. In this figure two stations which are graphically connected are in receiving range of each other. In this situation, the stations I and L can stimultaneously transmit a packet. These two packets will be correctly received by stations J and K respectively, provided that these stations remained silent during the transmission. This enlights the existence of several channels. The objective of the channel access control in a single hop topology was the maximization of the throughput. In a multiple hop topology, the objective is much less obvious. For example, when station J transmits a packet, it can be correctly received by station I and it can produce a collision in station K (with a packet sent by station L). "Must this transmission be considered as being harmful or not?" is the kind of questions that has to be answered. Below various objective functions that provide criteria to control the access rates will be discussed.

If it is assumed that a source-destination traffic matrix M were given, one could try to assign the individual access rates in order to minimize the time necessary to route this whole traffic matrix or, equivalently, in order to maximize the percentage, say a %, of the traffic matrix that can be routed per time unit. The objective would thus be to maximize the amount of traffic $a \times M$ that can be correctly transmitted per time unit. This maximization requires a global optimization of all the access rates. As described in "A distributed Controller for a Non-Persistent CSMA Channel", by P. J. Courtois, G. Scheys and P. Semal, Philips Research Laboratory, Bruxelles, Report R514, 1987, this optimization is computationally very cumbersome and most often unfeasible in practice. Furthermore, in distributed systems, only local optimizations of the access rates are allowed. Suboptimal objectives have therefore to be defined.

It is remarked that two kinds of throughput must be distinguished: the number of packets a station K correctly receives per time unit $F(\rightarrow K)$, called here below the input flow of station K, and the number of packets a station successfully transmits per time unit $F(K \rightarrow)$, called here below the output flow of station K. It is assumed that the station K will sooner or later receive an acknowledgement for this flow.

A first objective function could be the maximinzation of the smallest input flow:

$$\text{Objective 1.: Maximize} \left( \min_K F(\rightarrow K) \right) \quad (1)$$

To fullfill this objective, each station must determine which station (among its neighbours and itself) presents the smallest input flow and must update its own access rate in order to increase the input flow of that station. To implement this objective each station must communicate to others its current input $F(\rightarrow K)$ in order to allow the minimum in (1) to be computed. Once the minimum has been located, say in station I, the neighbours of I should modify their access rate in order to increase the input flow of station I. A station must therefore also be also to inform its neighbours of the way its input flow can be increased. Typically, each station K must be able to measure a current channel load $G_{cur}(K)$ as seen by itself and to determine the channel load $G_{nom}(K)$ which achieves its maximum input flow $F(\rightarrow K)$. If these two values are broadcast, the neighbours of station I can update their access rate in order to increase $F(\rightarrow I)$. The information to be broadcast by each station consists thus of the three values $$[F(\rightarrow K), G_{nom}(K), G_{cur}(K)], \quad (2)$$

or in a more condensed form the two values $$[F(\rightarrow K), G_r(K) = G_{cur}(K)/G_{nom}(K)] \quad (3)$$

It is remarked that this procedure only aims at increasing the number of packets correctly received by station K. Nothing guarantees that these packets are destined to station K or have to be relayed by station K.

The main criticism concerning the objective 1 is in fact that the station with the smallest input flow is not necessarily in need of an increase of its input flow; the input flow of this station, although small, could be sufficient. Conversely, the station with the largest input flow could still need some input flow increase. In order to meet this criticim, the individual needs should be taken into account. If $T(\rightarrow K)$ denotes the number of packets (per time unit) that have to be received by station K, the following objective function can be defined:

$$\text{Objective 2.: Maximize} \left( \min_{K} F(\rightarrow K)/T(\rightarrow K) \right) \quad (4)$$

With such an objective, a station would update its individual access rate g(K) in order to increase the input flow of the neighbouring station which presents the smallest ratio between what it receives and what it should receive. Unfortunately, the flow T(→K) that has to be received, is distributed among the neighbours of station K and is thus not available to any of them. Furthermore, in most cases the routing does not uniquely define by which station a packet has to be relayed. The following objective function tries to overcome this problem.

$$\text{Objective 3.: Maximize} \left( \min_{K} F(K\rightarrow)/T(K\rightarrow) \right) \quad (5)$$

Instead of considering the ratio between the flow that is correctly received and the flow that has to be received, one considers the ratio between the flow correctly sent and acknowledged, the output flow F(→K), and the flow which has to be sent T(K→). This ratio can be determined by measuring the output queue length of station K. If during a time period, the station K has successfully sent n(K) packets (they have been acknowldged) and if q(K) packets are still in queue at the end of that period, one has the following equality for that time period.

$$\frac{F(K\rightarrow)}{T(K\rightarrow)} = \frac{n(K)}{n(K) + q(K)} = O(K) \quad (6)$$

The quantity O(K), called the output ratio, can be determined by any station and broadcast to its neighbours, so that a local minimum, associated for example with station I, can be easily computed by each station separately. The objective now aims at increasing the minimum output ratio. Expression (5) shows that the only way to increase an output ratio O(I) consists in the increase of the output flow F(I→) since the routing is not considered as an optimization variable. However, an increase of the output flow F(I→) of a station is difficult to obtain since the station(s) which can relay the packets queued in I is(are) not known, a priori. A rough approach would consist in reducing the access rate of the neighbours of I in order to allocate the station I an increased access rate g(I). This simple approach will prove efficient in very precise cases only and extremely harmful if it is applied without restrictions.

This clearly enlights the dual character of the problems an access control must cope with in multiple hop topologies. On the one hand, a station, say K can inform its neighbours on how to increase its input flow F(→K), but K is not able to judge whether this increase is necessary (T(→K) is not known). On the other hand, a station I can try to inform its neighbours that it cannot transmit enough (its output ratio is too small), but, if it succeeds, its neighbours do not know how to react to increase the output flow of station I.

The example of FIG. 2 illustrates this situation. It also shows that the rough approach which consists in increasing the access rate of the station I which presents a locally minimum output ration O(I) could worsen the performances in other parts of the network.

Assume that the station T is overloaded by traffic coming mainly from the set M. As a result, I has a small output ratio, much smaller than that of its only neighbours A and especially E and F which transmit easily through the set L. An attempt at increasing the output flow of I by increasing its access rate g(I) would only worsen the situation for the set M which could contain the station (S) with minimum output ratio. This shows that access rates can only be increased with extreme care. This example clearly enlights the dual type of problems the access control has to face. On the one hand, the station I and possibly some stations in M know that their output flows are too small but do not know how to improve them and, on the other hand, that station T knows that its input flow could be larger, but does not know if an increase is necessary. This situation can only be resolved by allowing information exchange. Below a distributed protocol according to the invention will be described which aims at maximizing the smallest output ratio and which requires two consecutive information exchanges.

Referring again to the example illustrated in FIG. 2 this protocol according to the invention could comprise the following steps:

1. The station I broadcasts its output ratio;
2. (a) The station T realizes, by comparison, that the output ratio of station I is the smallest and that it is a potential receiver of station I's packets (i.e. by a check in its routing table); (b) The station T then informs its neighbours that its input flow must be increased and tell them how it can be done (i.e. by broadcasting $G_{cur}(T)$ and $G_{nom}(T)$;
3. The neighbours of T then modify their access rate in order to bring $G_{cur}(T)$ closer to $G_{nom}(T)$.

The protocol requires two consecutive information exchanges. First, the output ratios are exchanged. This allows each station K to compute its input flow increase tendency (IFIT):

$$IFIT(K) = [\min_{L|K\in R(L)} O(L)]^{-4}, \quad (7)$$

where R(L) denotes the set of stations which can relay the packets emitted by station L. The minimum is thus taken over the stations L which are neighbours (in hearing distance) of K and which can be relayed by K, i.e., L/K. This variable IFIT(K) measures how much the input flow F(→K) of station K should be improved (other measures of the input flow increase tendency will be discussed later). In the network as a whole, IFIT(K) reaches a maximum for the station(s) K which are relays of the station with the global minimum output ratio. The determination of the IFIT's corresponds to the step (2a) in the protocol above.

The second information exchange concerns the IFIT's. This exchange allows each station K to determine the station in its neighbourhood N(K) which presents the maximum IFIT:

$$IFIT(T_K) \stackrel{def}{=} \max_{J\in N(K)\cup K} IFIT(J) \quad (8)$$

and let $T_K$ denote this station. In $N(K)$, $T_K$ is the station which should have its input flow increased. The station K must then modify its access rate accordingly. Thus, this protocol aims at increasing a smallest output ratio $O(I)$ by increasing the input flow of a station $T_K$ which can relay I. The access rate $g(K)$ is thus updated according to the following rules which are indicated in FIG. 3A.

In this FIG. 3A $g_{min}$ and $g_{max}$ respectively denote the minimum and maximum access rates that are allowed and $\epsilon, \delta1, \delta2, \delta3$ and $\delta4$ are protocol parameters. Reasonable figures for these protocol parameters are given in FIG. 3B. When the load of the station $T_K$ is too high, all its neighbours reduce their access rate. If the load of $T_K$ is too light, then the station K is allowed to increase its access rate only if it has the minimum output ratio and if the station $T_K$ can relay K. When the traffic load of $T_K$ is already optimally tuned, then the only useful update consists in giving a small increase of access rate to the station with the smallest output ratio and in reducing slightly the access rates of the other stations.

The update of the access rates becomes more complicated when the station $T_K$ is not unique. In this case, the access rates must be updated in order to globally increase the input flow of the stations $T_K$. Some preference can be given to the stations $T_K$ which are the closest to the destination in order to give a higher priority to the traffic which has to leave the network.

The following more general definition of the output ratio takes limiting conditions into account:

$$O(K) = \begin{cases} \frac{1 + n(K)}{1 + n(K) + q(K)} & \text{if } q(K) \neq 0 \\ 1 & \text{if } q(K) = 0 \end{cases} \quad (11)$$

The output ratio of a station which had and has nothing to transmit $(n(K)=0=q(K))$ is thus maximum.

Furthermore the input flow increase tendency IFIT has been defined above as the inverse of a smallest output ratio. Practically, this guarantees "every" station which needs to transmit a minimum output flow. It can be seen as a fairness property of the protocol. Other measures of the IFIT could be the inverse of the average output ratio $$IFIT(K) = \frac{\sum_{L|K\epsilon R(L)} \frac{n(L)}{n(L) + q(L)} - 1}{\|(L|K\epsilon R(L))\|} \quad (12)$$

or the inverse of a globalized output ratio $$IFIT(K) = \frac{\sum_{L|K\epsilon R(L)} n(L) + q(L)}{\sum_{L|K\epsilon R(L)} n(L)} \quad (13)$$

With these measures, the performances of each station are mixed with those of its neighbours. The result may be a loss of fairness a situation where a station has only a few packets to transmit but has a null output flow.

The access rate $g(K)$ should be updated in a specific way when the station with maximum IFIT is the station K itself. This update must then take into account the way the own access rate $g(K)$ of station K interferes with the number of packets correctly received by station K. For example, if the station is unable to receive when it is transmitting, the access rate $g(K)$ must be reduced in order to increase the input flow of K.

All the protocols described here require information exchanges. One should therefore guarantee minimum output and input flows in each station in order to allow the protocol to work. A consequence of this requirement is that the fairness property of the protocol seems vital.

Figure 4:
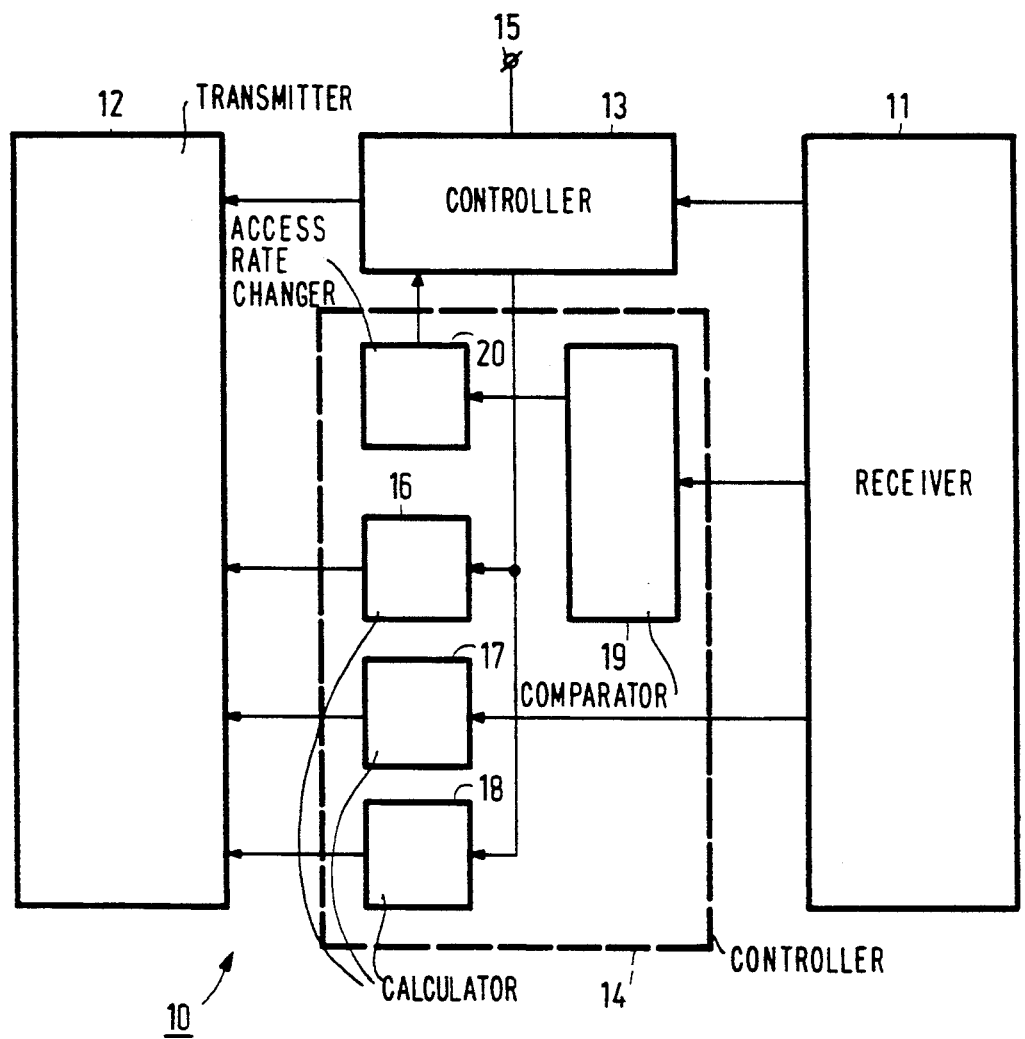
FIG. 4 illustrates a blockdiagram of a hardware implementation of one of the network stations.

A hardware configuration of the various circuits in a station, designed to function in a network in which the above described method is implemented, is schematically illustrated in FIG. 4.

FIG. 4 shows under the form of a block diagram a station 10 comprising a receiver section 11, a transmitter section 12, a traffic controller 13 and an additional controller 14. During operation the receiving section 11 functions to receive data packets from various channels, which data packets are transferred to the traffic controller 13. The traffic controller 13 monitors the destination of each received data packet and either transfers a received data packet to the transmitter section in case the station 10 has to relay the received data packet or transfers the received data packet to the output 15 in case the station 10 was the destination of the received data packet or discards the received data packet otherwise. The functioning of the receiving section 11, the transmitting section 12 and the traffic controller 13 is considered as known to the expert in this field and therefore a detailed description of the function of these circuits is considered superfluous.

As indicated above the station 10 is equipped with an additional controller 14, comprising a number of subcircuits, such as a first calculator 16, a second calculator 17, a third calculator 18, a comparison section 19 and access rate alterning means 20.

During operation the first calculator 16 receives information from the traffic controller 13 each time a data packet is successfully transmitted by the transmitting section 12. The calculator 16 calculates on the basis of the information received from the traffic controller 13 the above mentioned first parameter, which is indicative for the number of packets successfully transmitted per time unit by the transmitting section 12, or in other words the first parameter which is indicative for the output flow of the station 10. The calculated first parameter is supplied by the calculator 16 to the transmitter section 12 and transmitted to the neighbouring stations.

In station 10 the receiving section 11 also receives first parameters from neighbouring stations and these parameters are transferred from the receiving section 11 to a second calculator 17 in which they are used to calculate the aforementioned second parameter which is indicative for the input flow increase tendency of the station 10.

The third calculating means 18 receives information from the traffic controller 13 and calculates on the basis thereof a third parameter which is indicative for the load of the station 10.

Both the second parameter calculated by the second calculator 17 and the third parameter calculated by the third calculator 18 are transferred to the transmitting section 12 and transmitted to all neighbouring stations in reach of station 10.

Second and third parameters from neighbouring stations received in the receiving section 11 are transferred to a comparison section 19 in which the received parameters from all neighbouring stations are compared with each other and in which it is decided which station in the direct neighbourhood of station 10 has the largest input flow increase tendency. A signal reflecting this decision is transferred from the comparison section 19 to the access rate altering means 20 which responds to the reception of such a signal by providing suitable control signals to the traffic controller 13 to update the access rate of the station 10 in the manner as described above.

Although in FIG. 4 the additional controller 14 comprises a number of separate subcircuits 16, 17, 18, 19 and 20 it will be clear that in a more sophisticated embodiment the additional controller 14 may comprise a suitably programmed processor or computer in which the various calculations and comparison operations are carried out and which provides on the one hand suitable signals to the transmitting section 12 and on the other hand control signals to the traffice controller 13.

We claim:

1. A communications station for use in a data packet switching network, said network comprising a plurality of transmitting/receiving stations interconnected by communication channels, said data packages being tansferable between stations of the network through said channels according to a routing scheme, said communications station comprising:

communicating means for receiving data packets from, and transmitting data packets to, respective other stations of said network which are in transmission range of said station, said communicating means communicating with said channels at an access rate, first calculating means for calculating a first parameter which is mathematically related to output flow of said station, output flow being the number of packets successfully transmitted per unit of time, second calculating means for calculating a second parameter which is mathematically related to input flow of said station, input flow being a measure of output flows of said other stations, said second parameter increasing as said output flows decrease, third calculating means for calculating a third parameter indicative of a total load of said station, means for transmitting said first, second and third parameters to said other stations, and for receiving from said other stations (a) first other station parameter information which is mathematically related to output flow of the respective other station station, said output flow being the number of packets successfully transmitted by the respective other station per unit of time, (b) second other station parameter information which is mathematically related to input flow of said respective other station, and (c) third other station parameter information indicative of total load of said respective other station, altering means for altering said access rate of said station, means for controlling said transmitting means to transmit said first parameter at regular intervals, comparison means for comparing second parameter information and said third parameter information received from at least two said other stations to determine which said other station is a heaviest loaded station having the largest input flow increase tendency, and control means for causing said altering means to update said access rate with respect to said heaviest loaded station responsive to said third parameter information, in such manner as to bring said total load of said heaviest loaded station closer to a nominal channel load.

2. A station as claimed in claim 1, characterized in that said first parameter is an output ratio, said output ratio being a ratio between a flow of packets successfully transmitted to and acknowledged by another station, and a flow of packets which have to be sent by said station.

3. A station as claimed in claim 1, characterized in that said first parameter is an output ratio, said output ratio being a ratio between the number of packets successfully transmitted to and acknowledged by another station, and the sum of said number and the number of packets which are still in a queue in said station at an end of said period.

4. A station according to claim 1, characterized in that during operation said second calculating means calculate the input flow increase tendency according to the following algorithm:

$$IFIT(K) = [\min_{L | K \in R(L)} O(L)]^{-1},$$

wherein IFIT(K)=input flow increase tendency of station K, R(L)=the set of stations which can relay the packets emitted by station L, O(L)=output ratio of station L, and L/K the stations L which are neighbors of station K and which can be relayed by station K.

5. A station as claimed in claim 4, characterized in that said first parameter is an output ratio, said output ratio being a ratio between a flow of packets successfully transmitted to and acknowledged by another station, and a flow of packets which have to be sent by said station.

6. A station as claimed in claim 4, characterized in that said first parameter is an output ratio, said output ratio being a ratio between the number of packets successfully transmitted to and acknowledged by another station, and the sum of said number and the number of packets which are still in a queue in said station at an end of said period.

7. A station according to claim 1, characterized in that said first, second and third calculating means are combined in one suitably programmed computer.

8. A station according to claim 1, characterized in that the access rate g(K) of said station is updated by said altering means according to the following rules:

| | |
|---|---|
| if $Gr(T_K) > 1 + \epsilon$, | then $g(K) \leftarrow \max\{g(K) - \delta_1, gmin\}$, |
| $1 - \epsilon \leq Gr(T_K) \leq 1 + \epsilon$, if $IFIT(K) \neq [O(K)]^{-1}$, | then $g(K) \leftarrow \max\{g(K) - \delta_2, gmin\}$, |
| $1 - \epsilon \leq Gr(T_K) \leq 1 + \epsilon$, if $IFIT(K) = [O(K)]^{-1}$, | then $g(K) \leftarrow \min\{g(K) + \delta_3, gmax\}$, |
| $Gr(T_K) < 1 - \epsilon$, if $T_k \in R(K)$, $IFIT(T_D) = [O(K)]^{-1}$, | then $g(K) \leftarrow \min\{g(K) + \delta_4, gmax\}$, | wherein gmin and gmax respectively denote the minimum and maximum access rates that are allowed, $\epsilon$, $\delta_1$, $\delta_2$, $\delta_3$ and $\delta_4$ are protocol parameters, IFIT(K)=input flow increase tendency of station K, R(K)=the set of stations which can relay the packets emitted by station K, O(K)=output rate of station K, $T_K$ is the station in the neighborhood of station K which presents the maximum IFIT, and $Gr(T_K)$ is the load of station $T_K$.

9. A station as claimed in claim 8, characterized in that said first parameter is an output ratio, said output ratio being a ratio between a flow of packets successfully transmitted to and acknowledged by another station, and a flow of packets which have to be sent by said station.

10. A station as claimed in claim 8, characterized in that said first parameter is an output ratio, said output ratio being a ratio between the number of packets successfully transmitted to and acknowledged by another station, and the sum of said number and the number of packets which are still in a queue in said station at an end of said period.

11. A method of controlling access rates of communications stations in a data packet switching network, said network comprising a plurality of transmitting/receiving stations interconnected by communication channels, said data packages being transferable between stations of the network through said channels according to a routing scheme, and each station communicating via said channels at a respective access rate; said method comprising performing the following steps in each said communications station:
   calculating a first parameter which is mathematically related to output flow of said station, output flow being the number of packets successfully transmitted per unit of time,
   calculating a second parameter which is mathematically related to input flow of said station, input flow being a measure of output flows of said other stations, said second parameter increasing as said output flows decrease,
   calculating a third parameter indicative of a total load of said station,
   transmitting said first, second and third parameters to other stations in transmission range of said station, and receiving from said other stations
   (a) first other station parameter information which is mathematically related to output flow of the respective other station station, said output flow being the number of packets successfully transmitted by the respective other station per unit of time,
   (b) second other station parameter information which is mathematically related to input flow of said respective other station, and
   (c) third other station parameter information indicative of total load of said respective other station,
   comparing second parameter information and said third parameter information received from at least two said other stations to determine which said other station is a heaviest loaded station having the largest input flow increase tendency, and
   altering said access rate with respect to said heaviest loaded station responsive to said third parameter information, in such manner as to bring said total load of said heaviest loaded station closer to a nominal channel load.

12. A method as claimed in claim 11, characterized in that said first parameter is an output ratio, said output ratio being a ratio between a flow of packets successfully transmitted to and acknowledged by another station, and a flow of packets which have to be sent by said station.

13. A method as claimed in claim 11, characterized in that said first parameter is an output ratio, said output ratio being a ratio between the number of packets successfully transmitted to and acknowledged by another station, and the sum of said number and the number of packets which are still in a queue in said station at an end of said period.

14. A method according to claim 11, characterized in that the access rate g(K) of said station is updated by said altering step according to the following rules:

| | |
|---|---|
| if $Gr(T_K) > 1 + \epsilon$, | then $g(K) \leftarrow \max \{g(K) - \delta_1, gmin\}$, |
| $1 - \epsilon \leq Gr(T_K) \leq 1 + \epsilon$, if $IFIT(K) \neq [O(K)]^{-1}$, | then $g(K) \leftarrow \max \{g(K) - \delta_2, gmin\}$, |
| $1 - \epsilon \leq Gr(T_K) \leq 1 + \epsilon$, if $IFIT(K) = [O(K)]^{-1}$, | then $g(K) \leftarrow \min \{g(K) + \delta_3, gmax\}$, |
| $Gr(T_K) < 1 - \epsilon$, if $T_k \in R(K)$, $IFIT(T_K) = [O(K)]^{-1}$, | then $g(K) \leftarrow \min \{g(K) + \delta_4, gmax\}$, | wherein gmin and gmax respectively denote the minimum and maximum access rates that are allowed, $\epsilon$, $\delta_1$, $\delta_2$, $\delta_3$ and $\delta_4$ are protocol parameters, IFIT(K)=input flow increase tendency of station K, R(K)=the set of stations which can relay the packets emitted by station K, O(K)=output rate of station K, $T_K$ is the station in the neighborhood of station K which presents the maximum IFIT, and $GR(T_K)$ is the load of station $T_K$.

15. A method as claimed in claim 14, characterized in that said first parameter is an output ratio, said output ratio being a ratio between a flow of packets successfully transmitted to and acknowledged by another station, and a flow of packets which have to be sent by said station.

16. Method according to claim 11, characterized in that the input flow increase tendency is defined as:

$$IFIT(K) = [\min_{L | K \epsilon R(L)} O(L)]^{-1},$$

wherein IFIT(K)=input flow increase tendency of station K, R(L)=the set of stations which can relay the packets emitted by station L, O(L)=output ratio of station L, and L/K the stations L which are neighbors of station K and which can be relayed by station K.

17. A method as claimed in claim 16, characterized in that said first parameter is an output ratio, said output ratio being a ratio between a flow of packets successfully transmitted to and acknowledged by another station, and a flow of packets which have to be sent by said station.

* * * * *